Patented Sept. 20, 1949

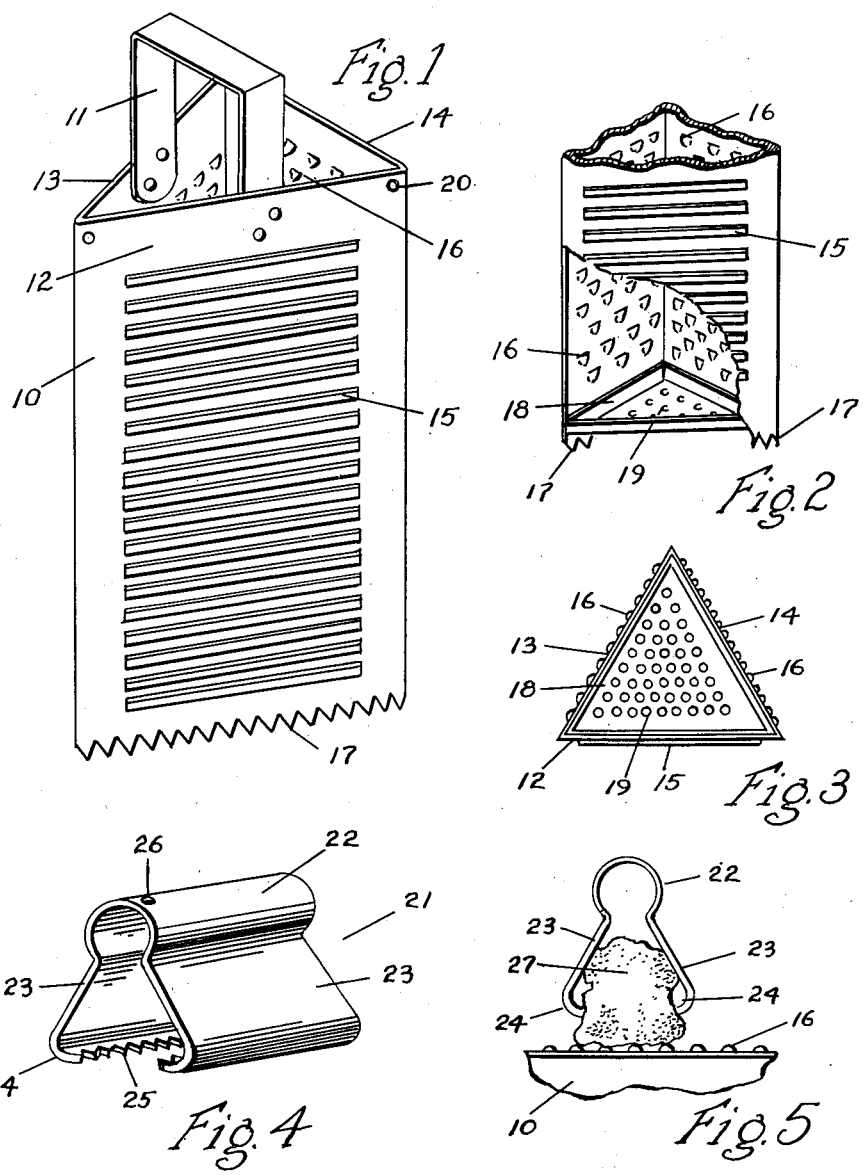

2,482,180

UNITED STATES PATENT OFFICE 2,482,180

FOOD GRATING AND SHREDDING DEVICE

Reginald Heard, Milwaukee, Wis.

Application April 2, 1945, Serial No. 586,201

2 Claims. (Cl. 146—180)

My invention relates to utensils and more particularly to a type of kitchen utensil that is commonly referred to as a grater.

The object of my invention is to provide a grater that has a plurality of flat surfaces affording space for a variety of grates, ranging from fine to coarse, and for shredding the food.

Another object of my invention is to provide such a device that can be readily used in practically any type of vessel and conveniently supported at its top.

Still another object of my invention is to incorporate into a device of the character described additional features, so that it may be employed as a food chopper and as a colander when a perforated bottom is provided.

Still another object of my invention is to provide a device that may be used in combination with a resilient clamp for supporting small particles of food that are to be grated thus preventing any injury to the user's fingers.

Other and further objects of my invention will become more apparent as the description proceeds when taken in conjunction with the drawing, in which, Figure 1 is a perspective view of the device.

Figure 2 is a fragmentary view illustrating the method in which a perforated bottom may be inserted near the lower end of the device so that the unit may be employed as a colander.

Figure 3 is a cross section of the device looking down near its top.

Figure 4 is a perspective view of the resilient clamp employed when grating small particles, and Figure 5 is a cross sectional view of the clamp supporting a small particle of food as applied to the grater.

Similar characters of reference indicate corresponding parts throughout the several views and referring now to the same, the character 10 shows the body of the device which in this particular case is shown triangular. However, it is understood that it may be constructed square, hexagon or any other convenient shape. There is a handle 11 shown at its top, and the flat faces of the triangular body 10 are indicated by the numerals 12, 13 and 14. These various flat surfaces obviously contain grating members of various natures so as to provide a fine or coarse grater or a means of slicing or shredding the food. These shred louvres are shown by the character 15 and extend laterally across the face of one of the flat surfaces. The grating surfaces are shown provided with projecting members 16, which may be of a fine or coarse or medium texture, on the various flat surfaces of the body 10. At the extreme bottom of the body 10 are shown a plurality of serrations or teeth 17. By employing these serrations 17 the device may be used as a food chopper when the food is placed into the bottom of a bowl or onto the flat face of a chopping board. The device may be manipulated by the handle 11.

In Figure 2, I show a bottom plate 18 perforated with a plurality of apertures 19 inserted movable within the inner space between the various grating surfaces. This bottom plate 18 is supported above the serrations 17 so as not to interfere with their performance as chopping means. I also show apertures 20, near the extreme corner of the triangular body 10, which permit inserting a cord or cable to which may be attached a resilient clamp 21 as shown in Figures 4 and 5. This clamp 21 has a cylindrically shaped resilient member 22 longitudinally disposed at its top and has angularly disposed side members 23 extending from the cylindrical top 22 terminating into jaws 24 provided with inwardly extending serrations or teeth 25. This clamp 21 is also provided with an aperture 26 for the attachment of the cord or cable not shown. The side members 23 are disposed at an angle so that they will be instrumental in forcing the particles of food, shown as 27, in Figure 5 towards the surfaces of the grate.

It is manifest to anyone familiar with the use of a utensil as directed that the construction shown readily lends itself and is adaptable to most any type of receptacle. The device affords a variety of uses. It may be used as a slicer, as a grater, with the perforated bottom employed it may be used as a colander, for it is obvious that the perforations permit straining of food, the teeth at the extreme bottom will permit its use as a chopping device, and in combination with the resilient clamp it provides a means of protecting the user's fingers against injury, permits utilization of food particles when grating down to a very small size. Furthermore, the device is inexpensive to manufacture, can be easily kept clean and sanitary and is of a shape that lends itself readily for storing away. The resilient clamp may be attached to the device at one of its apertures 20 or may be kept separate depending on the use to which the device will be put.

Having thus described my invention, what I claim and desire to secure by Letters Patent in the United States is:

1. A utensil of the character described comprising an integrally formed triangular body having three flat faces, a handle disposed at the top said handle attached to two of said faces, a perforated plate removably disposed near the bottom within said body, the extreme lower edge of said body provided with a plurality of serrations or teeth, cutting members embossed outwardly from said flat faces, said cutting members being of various sizes and depths to permit a variety of sizes of particles in the grating of the food.

2. A utensil of the character described comprising a triangular integral body open at its top and bottom, three flat faces at the outer periphery of said body, said faces provided with a plurality of cutting members embossed outward therefrom, said cutting members being of varied size and shape to produce varied sizes of particles of food being grated, a handle at the top of said body said handle rigidly attached to said body and a plurality of teeth or serrations as the extreme lower end of said body to permit the device to be used as a chopper.

REGINALD HEARD.

REFERENCES CITED

The following references are of record in the file of this patent:

UNITED STATES PATENTS

| Number | Name | Date |
|---|---|---|
| D. 117,381 | Nelson | Oct. 31, 1939 |
| D. 125,337 | Higginbotham | Feb. 18, 1941 |
| 1,497,192 | Morris | June 10, 1924 |
| 1,699,585 | Earles | Jan. 22, 1929 |
| 2,207,286 | Cohen | July 9, 1940 |

FOREIGN PATENTS

| Number | Country | Date |
|---|---|---|
| 3,697 | Great Britain | Mar. 11, 1887 |
| 8,705 | Great Britain | Nov. 1, 1898 |
| 21,791 | Great Britain | Sept. 25, 1912 |
| 778,088 | France | Dec. 15, 1934 |